(12) United States Patent
Lee et al.

(10) Patent No.: US 10,666,919 B1
(45) Date of Patent: *May 26, 2020

(54) COLOR AND BRIGHTNESS CALIBRATION FOR VIDEO STITCHING

(71) Applicant: Ambarella International LP, Santa Clara, CA (US)

(72) Inventors: Chih-Chun Lee, Hsinchu (TW); Pei-Chien Yu, Taipei (TW); Tsung-Han Wu, Hsinchu (TW); Wei-Kang Che, Hsinchu (TW)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/528,742

(22) Filed: Aug. 1, 2019

Related U.S. Application Data

(63) Continuation of application No. 16/035,925, filed on Jul. 16, 2018, now Pat. No. 10,419,734.

(51) Int. Cl.
| | | |
|---|---|---|
| *H04N 5/77* | (2006.01) | |
| *H04N 9/77* | (2006.01) | |
| *H04N 5/247* | (2006.01) | |
| *H04N 5/262* | (2006.01) | |
| *H04N 7/18* | (2006.01) | |

(52) U.S. Cl.
CPC ............... *H04N 9/77* (2013.01); *H04N 5/247* (2013.01); *H04N 5/262* (2013.01)

(58) Field of Classification Search
CPC .... H04N 5/262; H04N 5/247; H04N 5/23238; H04N 17/002; H04N 9/77; H04N 1/6052; H04N 1/387
USPC .......... 348/143, 148, 149, 153; 386/23, 224, 386/226, 227
See application file for complete search history.

(56) References Cited

U.S. PATENT DOCUMENTS

| | | | |
|---|---|---|---|
| 2014/0098185 A1 | 4/2014 | Davari | ............................. 348/36 |
| 2017/0039881 A1* | 2/2017 | Belch | .................. G09B 19/0038 |
| 2018/0338108 A1 | 11/2018 | Brady | |

* cited by examiner

*Primary Examiner* — Robert Chevalier
(74) *Attorney, Agent, or Firm* — Christopher P. Maiorana, PC

(57) ABSTRACT

An apparatus includes a plurality of cameras and a circuit. The cameras may be mounted on a vehicle and configured to generate a plurality of initial video signals of a scene outside of the vehicle. A plurality of fields of view of adjoining ones of the cameras may spatially overlap each other. The circuit may be configured to (i) store calibration values of the cameras generated during a calibration process, (ii) modify at least one of the initial video signals by applying the calibration values and (iii) generate a final video signal suitable to display to a user of the vehicle by stitching together the initial video signals. The calibration values may be used by the circuit to generate approximately continuous brightness within the scene in the final video signal.

20 Claims, 10 Drawing Sheets

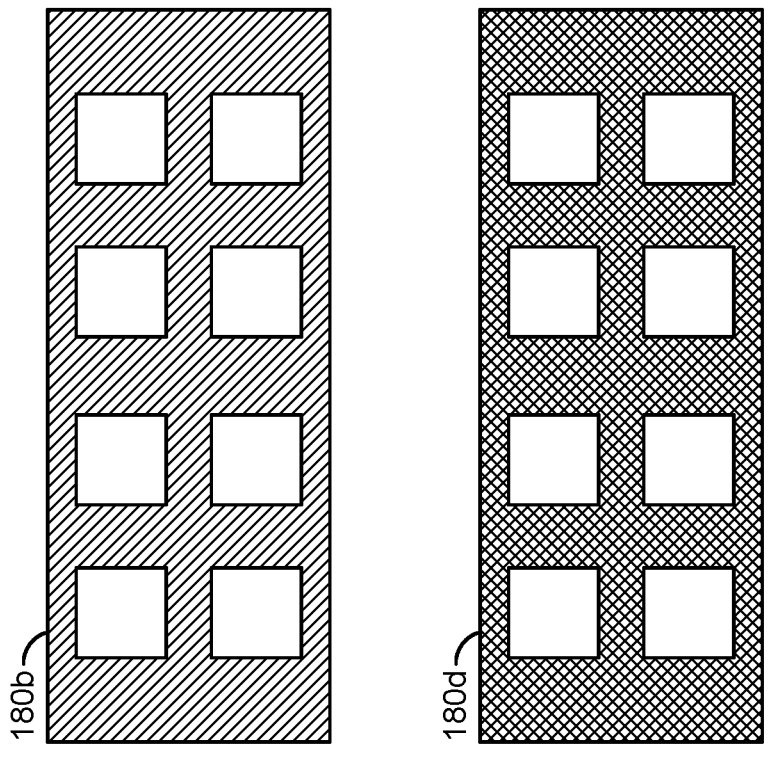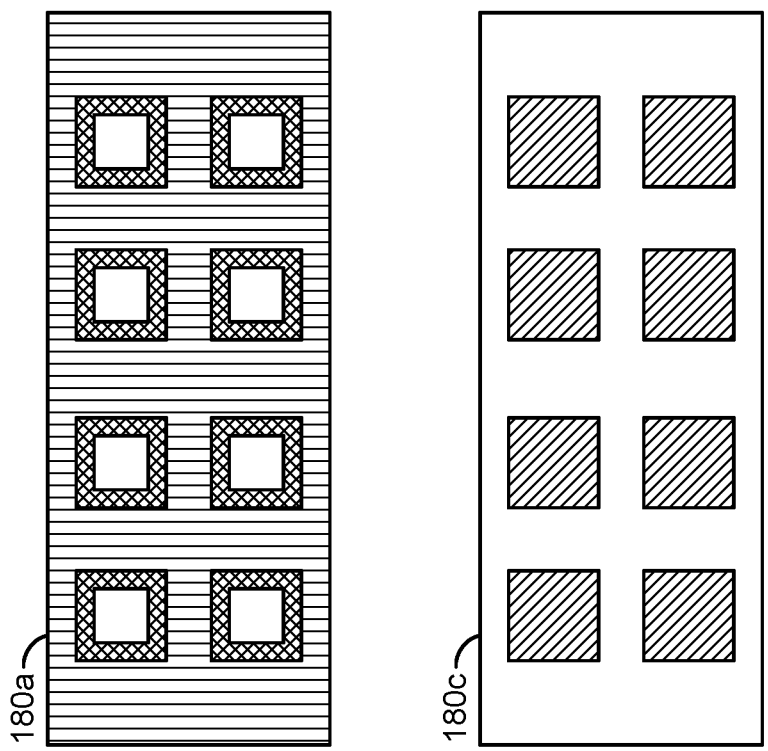
FIG. 5

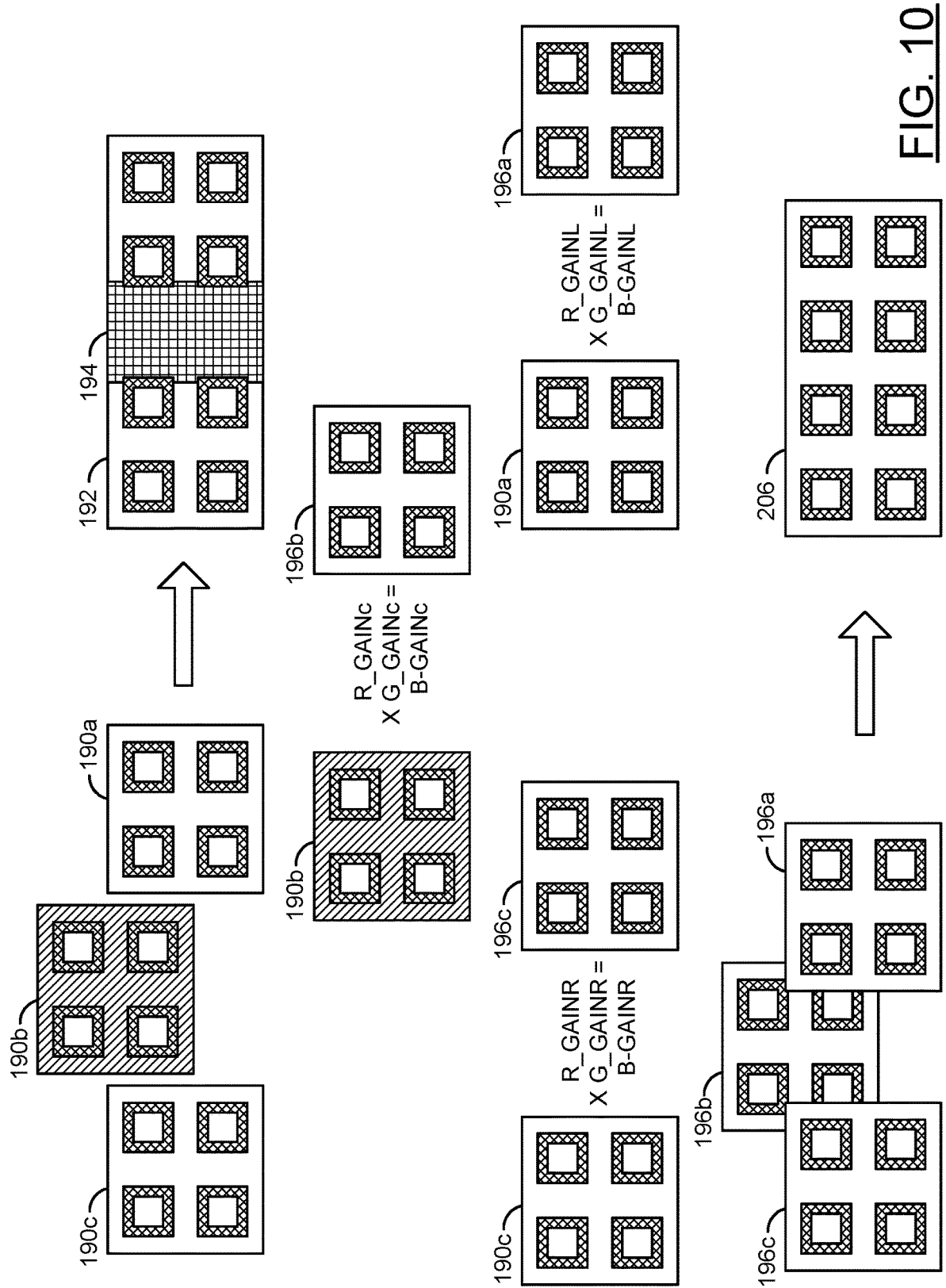

COLOR AND BRIGHTNESS CALIBRATION FOR VIDEO STITCHING

This application relates to U.S. Ser. No. 16/035,925, filed Jul. 16, 2018, which is incorporated by reference in its entirety.

FIELD OF THE INVENTION

The invention relates to video stitching generally and, more particularly, to a method and/or apparatus for implementing color and brightness calibration for video stitching.

BACKGROUND

Conventional video stitching technology is commonly used in multiple-camera systems. Due to different installation positions of the cameras, differences in the camera lenses and differences in the camera sensors, a color and a brightness of the stitched video are not continuous. The noncontiguous color and brightness usually create a darker vertical band in the stitched video that is visually distracting.

It would be desirable to implement color and brightness calibration for video stitching.

SUMMARY

The invention concerns an apparatus including a plurality of cameras and a circuit. The cameras may be mounted on a vehicle and configured to generate a plurality of initial video signals of a scene outside of the vehicle. A plurality of fields of view of adjoining ones of the cameras may spatially overlap each other. The circuit may be configured to (i) store calibration values of the cameras generated during a calibration process, (ii) modify at least one of the initial video signals by applying the calibration values and (iii) generate a final video signal suitable to display to a user of the vehicle by stitching together the initial video signals. The calibration values may be used by the circuit to generate approximately continuous brightness within the scene in the final video signal.

BRIEF DESCRIPTION OF THE FIGURES

Embodiments of the invention will be apparent from the following detailed description and the appended claims and drawings in which:

FIG. 5 is a diagram of calibration charts in accordance with an embodiment of the invention;

FIG. 10 is a diagram of another stitching technique in accordance with an embodiment of the invention.

DETAILED DESCRIPTION OF THE EMBODIMENTS

Embodiments of the present invention include providing color and brightness calibration for video stitching that may (i) provide approximately continuous brightness in a stitched video, (ii) provide approximately continuous colors in the stitched video, (iii) reduce visually distracting bands in the stitched video, (iv) determine statistics from raw video images and/or (v) be implemented as one or more integrated circuits.

Embodiments of the invention generally provide color and brightness calibration techniques for video stitching on systems that employ multiple cameras. The multiple-camera systems may be widely used in various fields, including but not limited to, military bases, government buildings, shopping malls, banks, schools and the like. Due to differences in installation positions, lenses and sensors of the cameras, the color and brightness of video signals generated by the cameras may be dissimilar in colors and/or brightness.

To retain continuous colors and continuous brightness of a stitched video, the calibration techniques of the invention generally provide compensation for gains based on raw domain sensor data. The compensated gains may be derived based on statistics of captured raw images. Using the raw images may help avoid reality losses created by conversions from the raw (e.g., Bayer) color domain to YUV or similar color domains. The raw images are generally captured by shooting a predefined calibration chart with all of the cameras simultaneously. The resulting compensated gains of the individual red, green and blue channels may be applied within the camera sensor controls and/or within an image signal processor control. The camera sensor control may be applied to a shutter, an analog gain, a digital gain per channel and/or globally. The image signal processor control generally enables global and/or per-channel gain control. With the sensor control and/or the image signal processor control, embodiments of the invention may effectively reduce a difference in colors and brightness among the cameras that participate in the video stitching.

Figure 1:
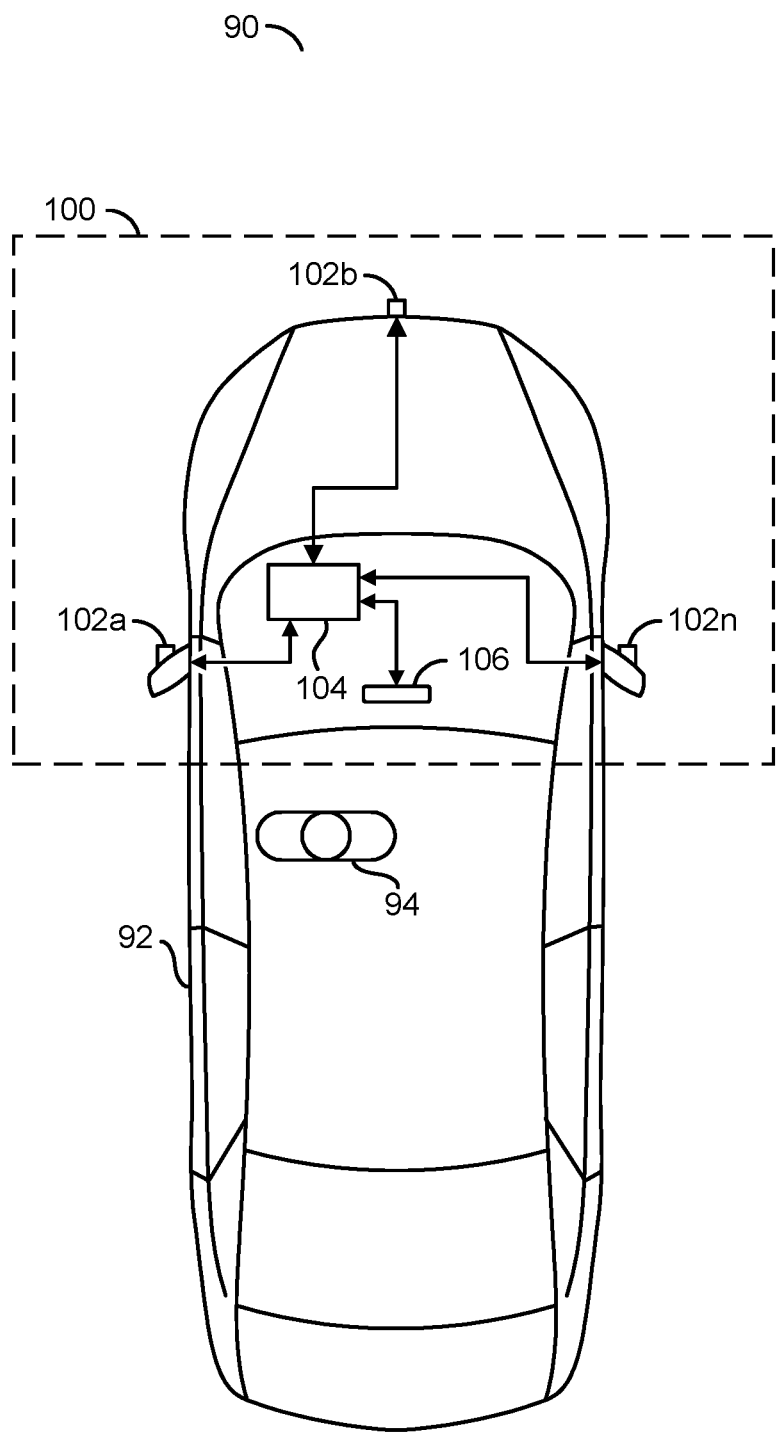
FIG. 1 is a diagram of a system in accordance with an embodiment of the invention.

Referring to FIG. 1, a block diagram of a system 90 is shown in accordance with an embodiment of the invention. The system 90 generally comprises a vehicle 92 and a block (or circuit) 100. The circuit (or system) 100 generally comprises multiple blocks (or circuits) 102a-102n, a block (or circuit) 104 and a block (or circuit) 106. The circuits 102a to 106 may be implemented in hardware, software, firmware or any combination thereof in an apparatus. A user 94 may be positioned in the vehicle 92 during normal operations.

In some embodiments, the vehicle 92 may be an automobile, a motorcycle, a truck, a van, a delivery vehicle, a commercial vehicle, a train, a plane, etc. The type of vehicle 92 may be varied according to the design criteria of a particular implementation. The vehicle 92 generally comprises a passenger compartment (or cabin). The user 94 may be situated in the passenger compartment. The user 94 is generally oriented to face the circuit 106. In various embodiments, the user 94 may be a driver of the vehicle 92.

The circuit 100 may implement a color and brightness calibration apparatus for video stitching. The apparatus 100 may be operational to implement a calibration technique to efficiently derive settings that may be applied at a sensor control level and/or an image digital signal processor control level. The derivation may capture raw sensor data in two or more cameras that simultaneously shoot to a calibration chart. The sensor data may be used to calculate compensation gain values for each color channel (e.g., red, green and blue) from the corresponding color patch averages of the raw sensor data. The resultant compensation gain values may be applied to compensate one or more of the cameras of the multiple-camera system. The compensation gain values may be applied to a camera sensor shutter, a camera analog gain, and/or the digital gain on an image signal processor.

Each circuit 102a-102n may implement a color camera circuit. The cameras 102a-102n are generally operational to create video signals representative of a scene outside the vehicle 92. The cameras 102a-102n may be mounted on the vehicle 92. In an example embodiment, the cameras 102a-102n may be positioned in a basically horizontal arrangement. In embodiments with an odd number of cameras 102a-102n (e.g., three cameras 102a, 102b and 102n) the middle camera 102b may be positioned half way between the leftmost camera 102a and the rightmost camera 102n. Other camera arrangements may be implemented to meet the design criteria of a particular application. In some embodiments, the cameras 102a-102n may be facing approximately forward relative to a normal direction of travel for the vehicle 92. Other camera directions may be implemented to meet the design criteria of a particular application.

The circuit 104 may implement a processor circuit. In some embodiments, the processor may comprise one or more processors, including but not limited to one or more central processor units, one or more image signal processors and/or one or more digital signal processors. The processor 104 is generally operational to compensate the video signals generated by the cameras 102a-102n and subsequently stitch the compensated video signals into a stitched signal. The stitched signal may be presented to the circuit 106 for display to the user 94.

The circuit 106 may implement a display circuit. The display 106 is generally operational to display the stitched video created by the processor 104 to the user 94. In various embodiments, the display 106 may be a two-dimensional display. In some embodiments, the display 106 may be a virtual display.

Figure 2:
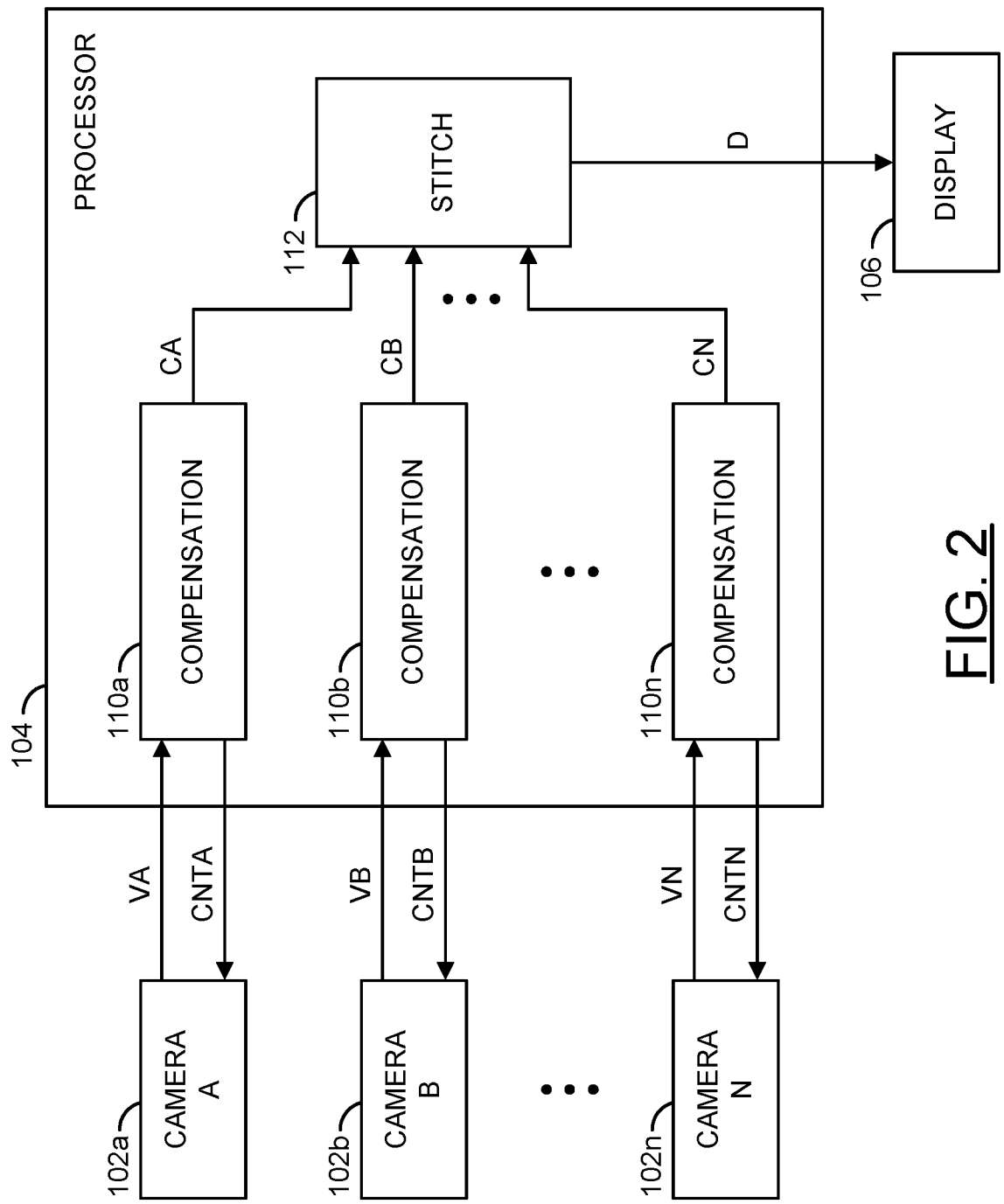
FIG. 2 is a diagram of a processor of the system in accordance with an embodiment of the invention.

Referring to FIG. 2, a diagram of an example implementation of the processor 104 is shown in accordance with an embodiment of the invention. The processor 104 generally comprises multiple blocks (or circuits) 110a-110n and a block (or circuit) 112. The circuits 110a to 112 may be implemented in hardware, software, firmware or any combination thereof in an apparatus.

A signal (e.g., VA) may be generated by the camera 102a and presented to the circuit 110a. The signal VA may be an internal video signal generated by the camera 102a. The signal VA generally comprises a sequence of color images (e.g., frames and/or fields). A signal (e.g., CNTA) may be generated by the circuit 110a and presented to the camera 102a. The signal CNTA may convey control information to the camera 102a. A signal (e.g., VB) may be generated by the camera 102b and presented to the circuit 110b. The signal VB may be another internal video signal generated by the camera 102b. The signal VB generally comprises a sequence of color images. A signal (e.g., CNTB) may be generated by the circuit 110b and presented to the camera 102b. The signal CNTB may convey control information to the camera 102b. A signal (e.g., VN) may be generated by the camera 102n and presented to the circuit 110n. The signal VN may be an internal video signal generated by the camera 102n. The signal VN generally comprises a sequence of color images. A signal (e.g., CNTN) may be generated by the circuit 110n and presented to the camera 102n. The signal CNTN may convey control information to the camera 102n. Similar video signals and control signals may be exchanged between the cameras 102c-102m and the circuits 110c-110m.

The circuit 110a may generate a signal (e.g., CA) received by the circuit 112. The signal CA may convey either the original images in the signal VA or a compensated version of the images in the signal VA. The circuit 110b may generate a signal (e.g., CB) received by the circuit 112. The signal CB may convey either the original images in the signal VB or a compensated version of the images in the signal VB. The circuit 110n may generate a signal (e.g., CN) received by the circuit 112. The signal CN may convey either the original images in the signal VN or a compensated version of the images in the signal VN. Similar compensated video signals may be presented from the circuits 110c-110m to the circuit 112. The circuit 112 may generate a signal (e.g., D) transferred to the display 106. The signal D may be the stitched video signal. The stitched video signal D may comprise the images from the compensated video signals CA, CB and CC.

Each circuit 110a-110n may implement a compensation circuit. The compensation circuits 110a-110n are generally operational to either pass or compensate the colors and/or brightness of the images received in the signals VA-VN, respectively. The passed/compensated images may be presented to the circuit 112 in the signals CA-CN, respectively.

The circuit 112 may implement a stitch circuit. The stitch circuit 112 is generally operational to stitch together the images received in the signals CA-CN. The combination of the images from the signals CA-CN may be the stitched signal D. The stitched signal D may be presented by the stitch circuit 112 to the display 106.

Figure 3:
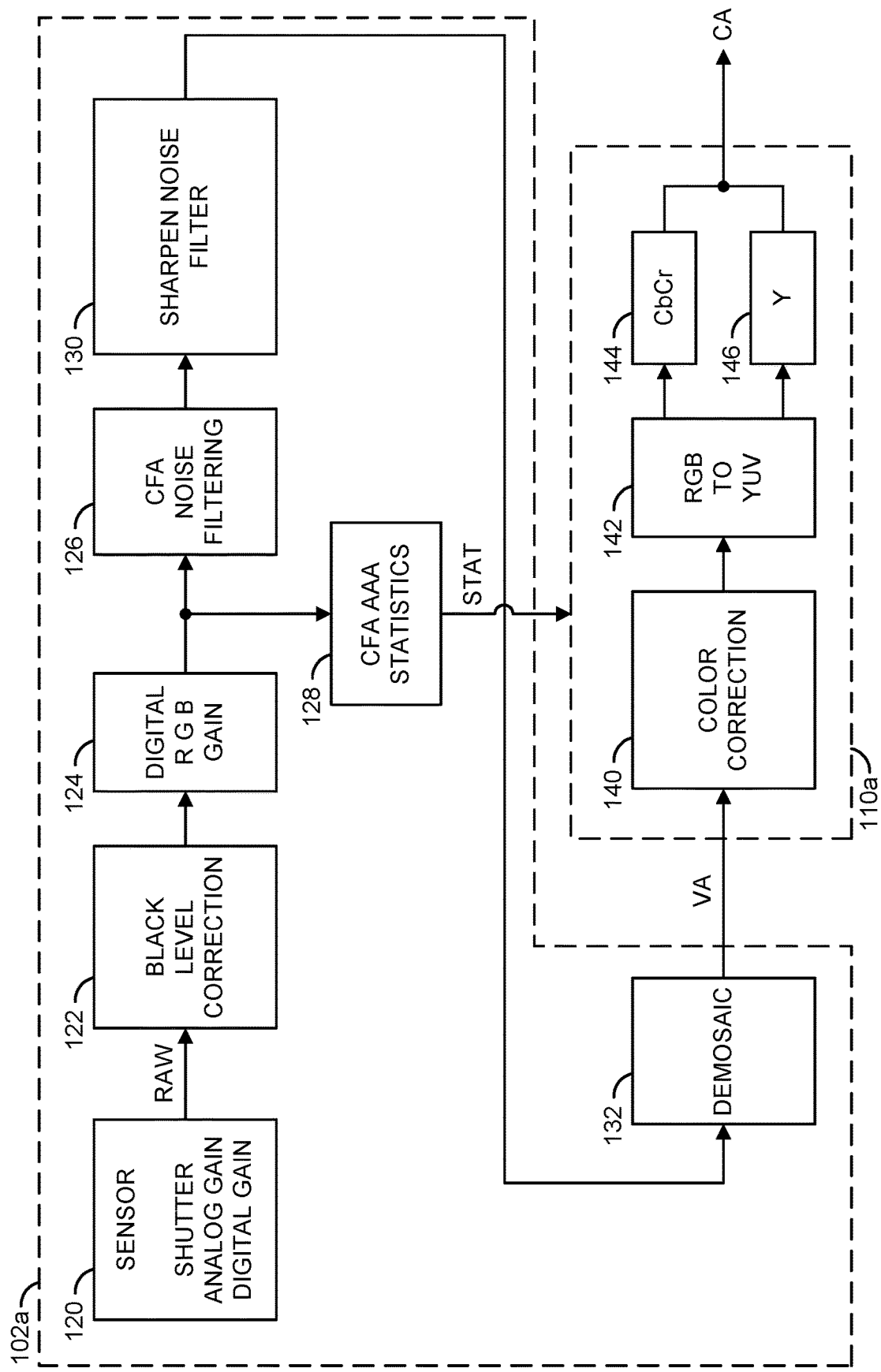
FIG. 3 is a diagram of a camera and a compensation circuit of the system in accordance with an embodiment of the invention.

Referring to FIG. 3, a block diagram of an example implementation of the camera 102a and the compensation circuit 110a is shown in accordance with an embodiment of the invention. The camera 102a may be representative of the other cameras 102b-102n. The compensation circuit 110a may be representative of the other compensation circuits 110b-110n. The camera 102a generally comprises a block (or circuit) 120, a block (or circuit) 122, a block (or circuit) 124, a block (or circuit) 126, a block (or circuit) 128, a block (or circuit) 130 a block (or circuit) 132. The compensation circuit 110a generally comprises a block (or circuit) 140, a block (or circuit) 142, a block (or circuit) 144 and a block (or circuit) 146. The circuits 120 to 146 may be implemented in hardware, software, firmware or any combination thereof in an apparatus.

A signal (e.g., RAW) may be generated by the circuit 120 and transferred to the circuit 122. The signal RAW may convey raw sensor data (e.g., individual imaging cells) created by the circuit 120. A signal (e.g., STAT) may be generated by the circuit 128 and presented to the compensation circuit 110a. The signal STAT may carry statistics data gathered from the images generated by the circuit 120. The signal VA may be generated by the circuit 132 and presented to the circuit 140. The signal CA may be generated by the circuit 144 and the circuit 146.

The circuit 120 may implement a sensor circuit. The sensor 120 is generally operational to convert captured light into the electrical signal RAW. In various embodiments, the sensor 120 may generate a sequence of images in the signal RAW. Each image may include an array of pixels in a Bayer color domain (e.g., red, green, blue and green). The sensor 120 may be responsive to commands to control a shutter time, an analog gain and/or a digital gain.

The circuit 122 may implement a black level correction circuit. The black level correction circuit is generally operational to correct a black level in the images generated by the sensor 120. The corrected pixels in the images may be presented to the circuit 124.

The circuit 124 may implement a digital color gain circuit. The digital color gain circuit 124 is generally operational to control a gain for each color channel in the pixels of the images. The gain-adjusted color data of the pixels may be presented to the circuit 126 and the circuit 128.

The circuit 126 may implement a noise filtering circuit. In an example embodiment, the noise filtering circuit may be implemented as a color filter array (CFA) noise filtering circuit. The noise filtering circuit 126 is generally operational to filter spatial noise in the images. The filtered data of the pixels may be presented to the circuit 130.

The circuit 128 may implement a statistics circuit. In various embodiments, the circuit 128 may implement a color filter assembly auto-exposure, auto-white balance, auto-focus (AAA) statistics circuit. The statistics circuit 128 is generally operational to gather statistics data of the calibration chart within the images. The statistics may include the color patch averages of each sensor raw data. The statistics data may be presented to the compensation circuit 110a in the signal STAT.

The circuit 130 may implement another filter circuit. In some embodiments, the circuit 130 may be a sharpen noise filter circuit. The noise filter circuit 130 is generally operational to sharpen the images in the video signal as received from the noise filtering circuit 126.

The circuit 132 may implement a demosaic circuit. The demosaic circuit 132 is generally operational to demosaic the pixels in the Bayer color domain to a red, green, blue (RGB) color space. The demosaiced pixel data may be presented in the signal VA to the circuit 140.

The circuit 140 may implement a color correction circuit. The color correction circuit 140 is generally operational to provide colorspace corrections to the pixel data received in the signal VA. The color corrected pixel data may be presented to the circuit 142.

The circuit 142 may implement a colorspace conversion circuit. The colorspace conversion circuit 142 may be operational to convert the pixel data from the RGB color space to a luminance-chrominance color space (e.g., YUV or YCC). The chrominance components (Cb, Cr) of the pixel data may be presented to the circuit 144. The luminance (Y) components of the pixel data may be presented to the circuit 146.

The circuit 144 may implement a buffer circuit. The buffer circuit 144 is generally operational to buffer the chrominance video portion (e.g., Cb and Cr) of the signal CA.

The circuit 146 may implement another buffer circuit. The buffer circuit 146 is generally operational to buffer the luminance video portion (e.g., Y) of the signal CA. The circuits 144 and 146 together may present the compensated pixel data in the signal CA.

Figure 4:
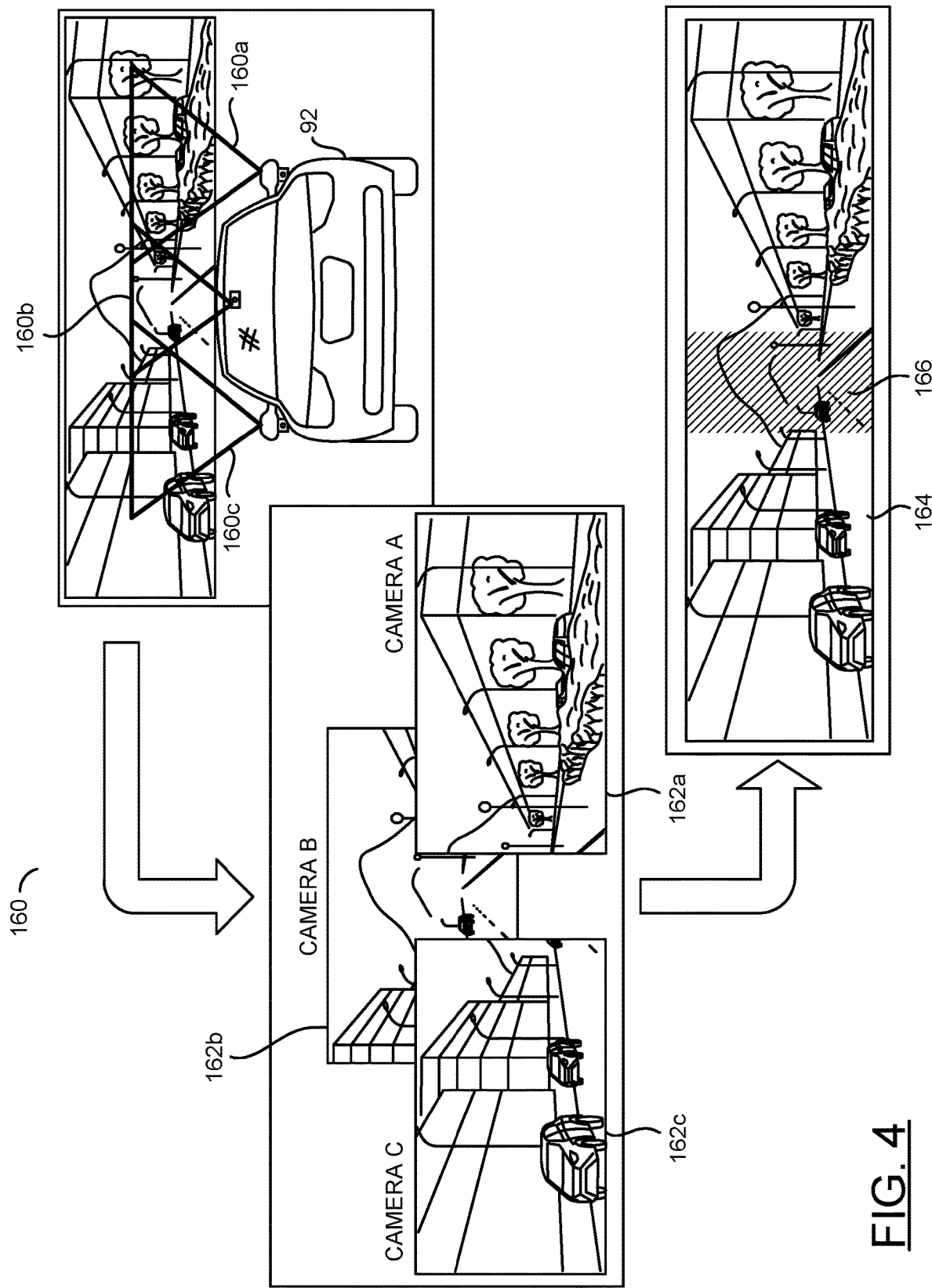
FIG. 4 is a diagram illustrating an operation of the system in accordance with an embodiment of the invention.

Referring to FIG. 4, a diagram illustrating an example operation of the system 100 is shown in accordance with an embodiment of the invention. The examples may illustrate three cameras 102a-102c mounted along a front of the vehicle 92. The outer cameras 102a and 102c may be mounted on exterior side view mirrors. The center camera 102b may be mounted high in the front windshield (e.g., on the interior rearview mirror).

Each camera 102a-102c may have a corresponding field of view 160a-160c generally pointed ahead of the vehicle 92. Neighboring fields of view 160a-160c may spatially overlap such that neighboring cameras 102a-102c capture common areas in the scene ahead of the vehicle 92. The different fields of view 160a-160c may result in the cameras 102a-102c capturing different parts of the scene in different images 162a-162c. Since the field of view 160a overlaps with the field of view 160b, the resulting images 162a and 162b may spatially overlap. Likewise, the field of view 160b may spatially overlap with the field of view 160c. Therefore, the images 162b and 162c may spatially overlap.

A common stitching that combines the images 162a-162c together may result in an image 164 suitable for the display 106. However, due to differences in the images 162a-162c, a band 166 may be created in the stitched image 164. In many situations, the band 166 may be darker and have slightly different colors than the surrounding sections.

Referring to FIG. 5, a diagram of example implementations of calibration charts 180 is shown in accordance with an embodiment of the invention. Several different designs (e.g., 180a-180d) may be implemented in the calibration charts 180. Each individual calibration chart 180a-180d may include multiple patches arranged in a two-dimensional array (e.g., eight patches arranged in a 4 horizontal by 2 vertical array are illustrated). In an example implementation, the calibration chart 180a may be implemented as a set of lightly colored (e.g., white) rectangles on a grey (or of other color) background. Each rectangle may be surrounded by a dark colored (e.g., black) border. The calibration chart 180b generally comprises a set of lightly colored (e.g., white) rectangles on a grey (or other color) background. The calibration chart 180b may lack the darkly colored borders around the lightly colored rectangles. The calibration chart 180c may include a set of grey rectangles on a lightly colored (e.g., white) background. The calibration chart 180d generally comprises a set of lightly colored (e.g., white) rectangles on a dark (e.g., black) background. Although the calibration charts 180a-180d may be illustrated in shades of grey, color (e.g., red, blue, green, etc.) may be included on the calibration charts 180a-180d. Other patterns beside rectangles may be implemented to meet the design criteria of a particular application.

Figure 6:
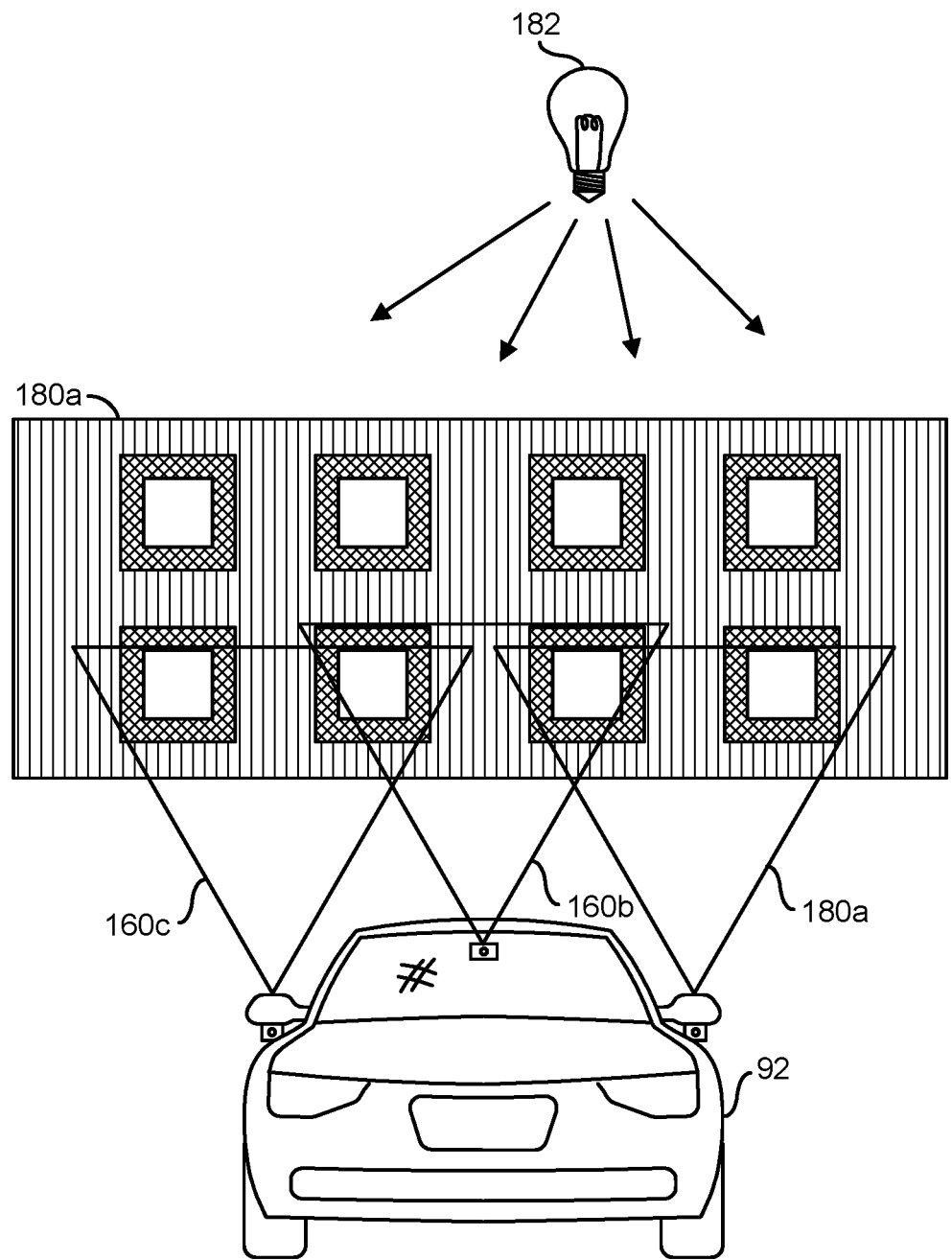
FIG. 6 is a diagram of a calibration setup in accordance with an embodiment of the invention.

Referring to FIG. 6, a diagram of an example implementation of a calibration setup is shown in accordance with an embodiment of the invention. The vehicle 92 may be parked in a position such that the cameras 102a-102c see one or more calibration charts (e.g., calibration chart 180a is illustrated). The calibration chart 180a may be illuminated with a uniform light from a light source 182. The setup is generally illustrated looking at the front of the vehicle 92. As such, the camera 102a on the left side of the vehicle 92 appears on the right side of the figure.

The cameras 102a-102c may capture sequences of images in the internal video signals VA-VC. Each video signals VA-VC generally includes at least a portion of the calibration chart 180a. The statistics circuit 128 in each camera 102a-102c may measure the statistics from the calibration chart 180a from the sensor raw data. The statistics may be the color patch averages of each sensor raw data. The processor 104 may generate the calibration data from the statistics and store the calibration data internally in a volatile and/or nonvolatile memory.

During normal use of the vehicle 92, the processor 104 may read the calibration data from the memory, modify at least one of the initial video signals VA-VC by applying the calibration values, and generate the final stitched video signal D. The calibration data values may be used to generate approximately continuous brightness and/or continuous colors within the scene in the final stitched video signal.

Figure 7:
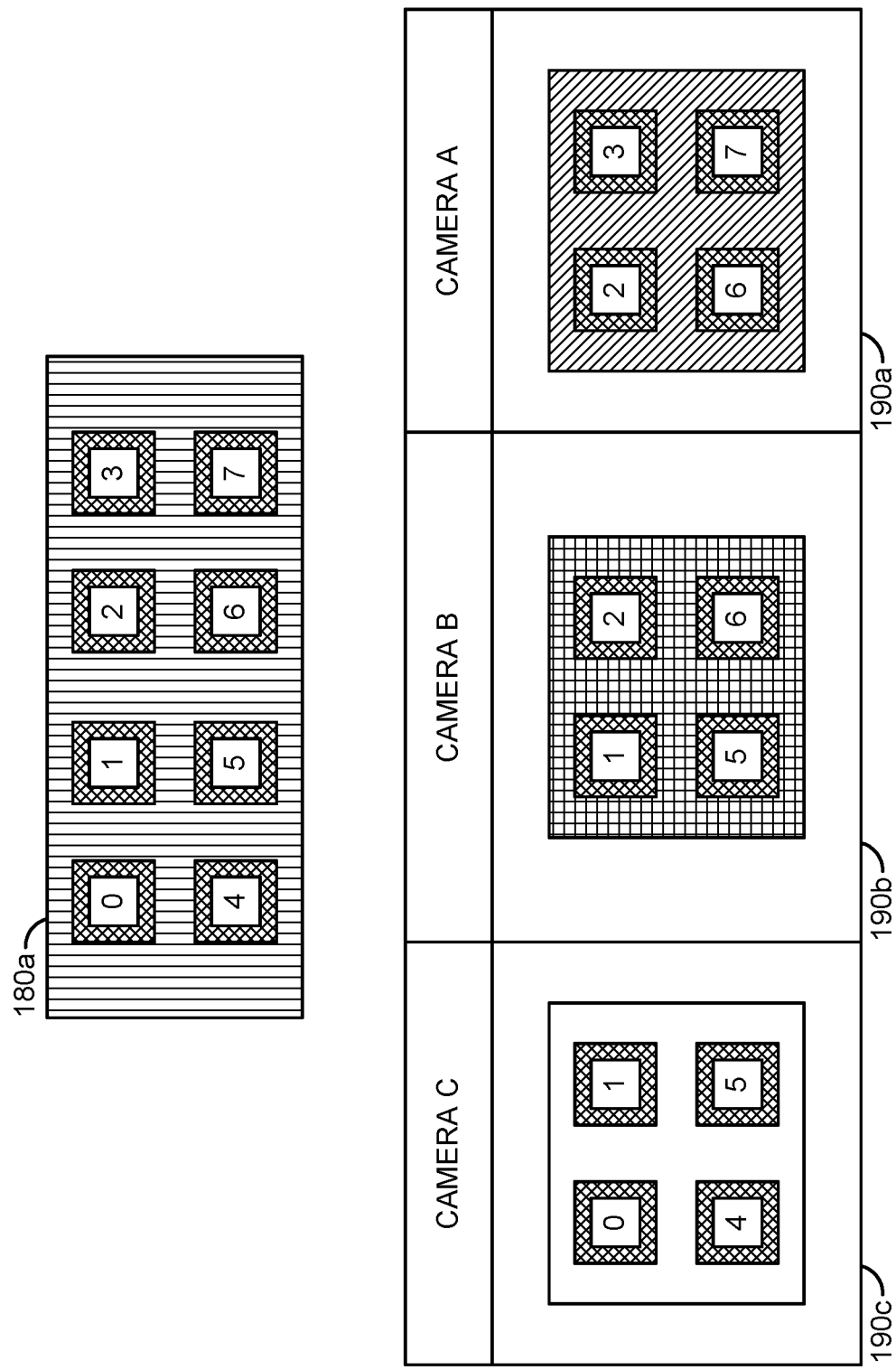
FIG. 7 is a diagram of different camera views of the calibration chart in accordance with an embodiment of the invention.

Referring to FIG. 7, a diagram of different example camera views of the calibration chart 180a is shown in accordance with an embodiment of the invention. The camera views may be the same as in FIG. 6. The calibration chart 180a generally comprises multiple (e.g., 8) patches. In the figure, the different patches are labeled 0-7. The camera 102c may generate a sequence of one or more images 190c that includes the patches 0, 4, 1 and 5. The camera 102b may generate a sequence of one or more images 190b that includes the patches 1, 5, 2 and 6. As such, the images 190c and 190b have at least a one patch column overlap where both images 190c and 190b include the patches 1 and 5. The camera 102a may generate a sequence of one or more images 190a that includes the patches 2, 6, 3 and 7. The images 190b and 190a generally overlap by at least one patch column so both images 190b and 190a may include the patches 2 and 6. The patch columns 1,5 and 2,6 may be used to generate the statistics.

Consider a naming convention of XYN, where (i) X may be R (red color channel), G (green color channel) or B (blue channel), (ii) Y may be R (right camera), C (center camera) or L (left camera) and (iii) N may be the patch number (e.g., 0, 1, 2, 7). The statistics may be named as follows:

Right Camera 102c
- RR1: The averaged R of color patch 1
- GR1: The averaged G of color patch 1
- BR1: The averaged B of color patch 1
- RR5: The averaged R of color patch 5
- GR5: The averaged G of color patch 5
- BR5: The averaged B of color patch 5

Center Camera 102b
- RC1: The averaged R of color patch 1
- GC1: The averaged G of color patch 1
- BC1: The averaged B of color patch 1
- RC2: The averaged R of color patch 2
- GC2: The averaged G of color patch 2
- BC2: The averaged B of color patch 2
- RC5: The averaged R of color patch 5
- GC5: The averaged G of color patch 5
- BC5: The averaged B of color patch 5
- RC6: The averaged R of color patch 6
- GC6: The averaged G of color patch 6
- BC6: The averaged B of color patch 6

Left Camera 102a
- RL2: The averaged R of color patch 2
- GL2: The averaged G of color patch 2
- BL2: The averaged B of color patch 2
- RL6: The averaged R of color patch 6
- GL6: The averaged G of color patch 6
- BL6: The averaged B of color patch 6

The average gains per color of the left and right cameras 102a and 102c may be calculated by the processor 104 per formulae 1 to 3 as follows:

$$R=(RR1+RR5+RL2+RL6)/4 \quad (1)$$

$$G=(GR1+GR5+GL2+GL6)/4 \quad (2)$$

$$B=(BR1+BR5+BL2+BL6)/4 \quad (3)$$

The average gains of the center camera 102b may be calculated by the processor 104 per formulae 4 to 6 as follows:

$$RC=(RC1+RC5+RC2+RC6)/4 \quad (4)$$

$$GC=(GC1+GC5+GC2+GC6)/4 \quad (5)$$

$$BC=(BC1+BC5+BC2+BC6)/4 \quad (6)$$

The calibration values used to compensate the center video signal VB may be calculated per formulae 7 to 9 as follows:

$$R\_GAINC=R/RC \quad (7)$$

$$G\_GAINC=G/GC \quad (8)$$

$$B\_GAINC=B/BC \quad (9)$$

The resulting calibration values R_GAINC, G_GAINC and B_GAINC may be stored in a local memory by the processor 104 for later use. For systems 100 stitching together only two video signals from two cameras (e.g., 102a and 102b), formulae 1 to 3 may be shortened to the average of just the left camera patches that overlap the center camera patches (e.g., patches 1 and 5).

Figure 8:
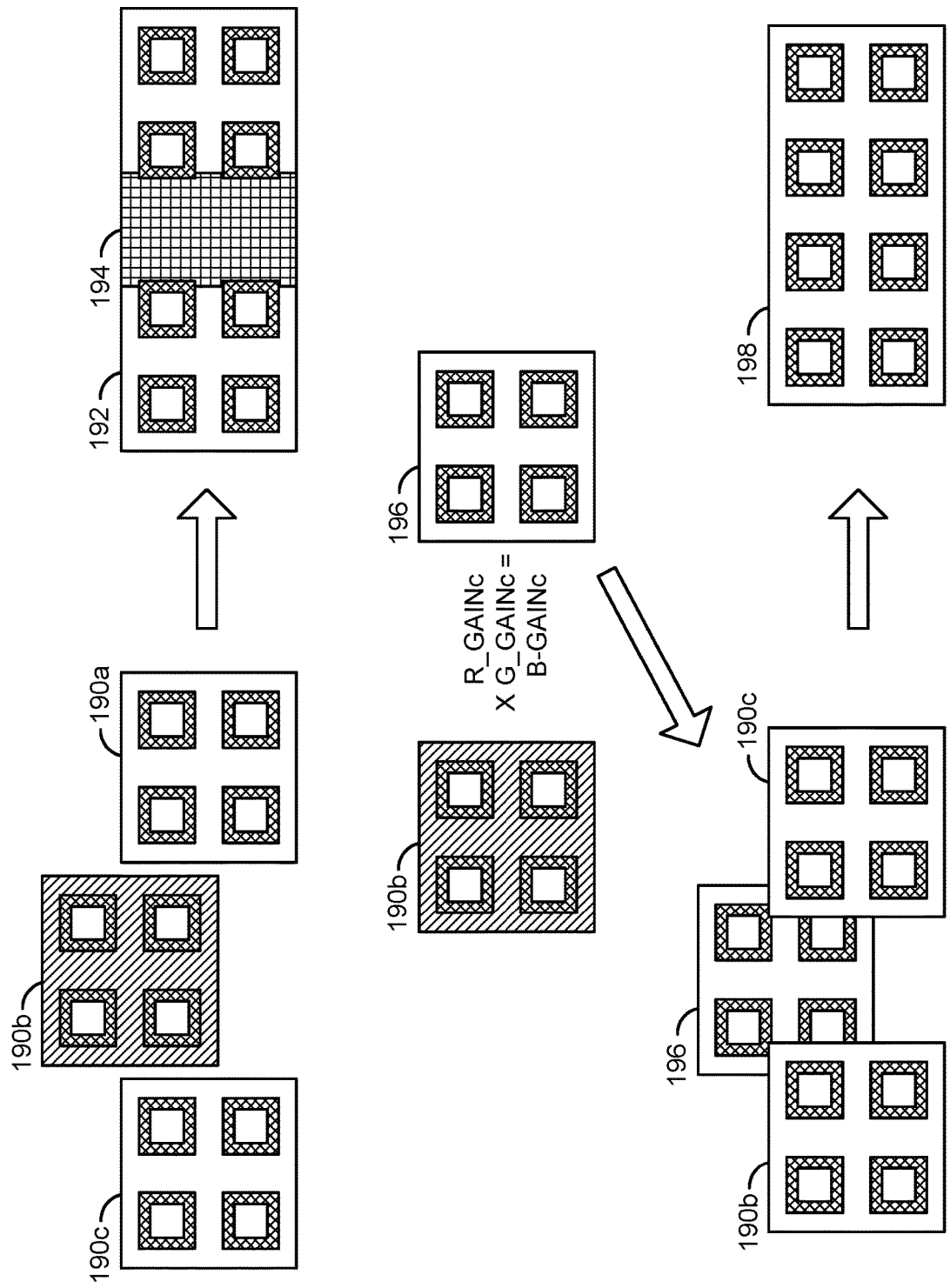
FIG. 8 is a diagram of a stitching technique in accordance with an embodiment of the invention.

Referring to FIG. 8, a diagram of an example sequence of a stitching technique is shown in accordance with an embodiment of the invention. The camera views may be the same as in FIG. 7. For an apparatus 100 with three cameras 102a-102c, the same shutter speed and same analog gain may be set for all of the cameras 102a-102c. The cameras 102a-102c may acquire the images 190a-190c. The center image 190b may be slightly darker than the outer images 190a and 190c. In various embodiments, the darkness may be due to the center camera 102b being mounted inside the vehicle 92 and thus is looking through the front windshield. The images 190a-190c may be stitched together to form a stitched image 192. Without the compensation provided by the processor 104, the stitched image 192 may include a band 194 with a different luminance and/or chrominance than the neighboring areas within the stitched image 192.

In accordance with an aspect of the stitching technique, the center image 192b from the middle camera 102b may be compensated prior to the stitching. The earlier measured center calibration values (e.g., R_GAINC, G_GAINC and B_GAINC) may be used to alter the center image 190b in the compensation circuit 110b to generate a compensated image 196. The compensation circuit 110a may be configured to allow the images in the signal VA to pass through unaltered to the signal CA. The compensation circuit 110c may be configured to allow the images in the signal VC to pass through unaltered to the signal CC. The stitching circuit 112 may stitch the uncompensated images 190c and 190a with the compensated image 196 to create the stitched image 198. The stitched image 198 generally lacks the band 194 of the stitched image 192.

Figure 9:
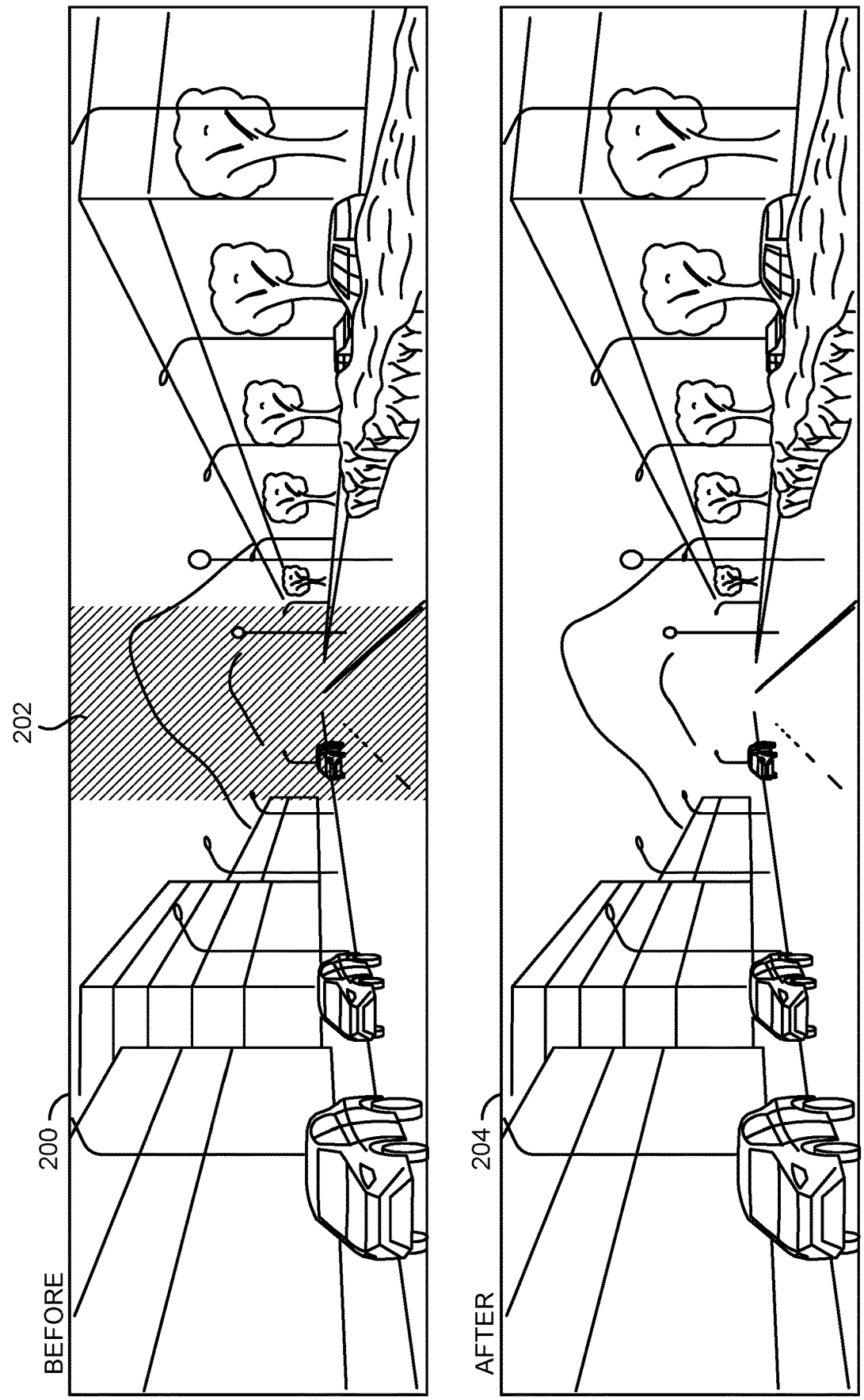
FIG. 9 is a diagram of stitched images in accordance with an embodiment of the invention.

Referring to FIG. 9, a diagram of example stitched images is shown in accordance with an embodiment of the invention. An uncompensated stitched image 200 generally shows a result of stitching together the video from three cameras 102a-102c. A portion 202 of the image 200 generated by the middle camera 102b may be darker and/or have a slightly different color than the neighboring portions generated by the outer cameras 102a and 102c. By introducing the compensation into the middle video signal CB, the resulting stitched image 204 may have a uniform brightness and uniform colors in the center portion generated by the middle camera 102b.

Referring to FIG. 10, a diagram of an example sequence of another stitching technique is shown in accordance with an embodiment of the invention. The camera views may be the same as in FIG. 8. For an apparatus 100 with three cameras 102a-102c, the same shutter speed and same analog gain may be set for all of the cameras 102a-102c. The cameras 102a-102c may acquire the images 190a-190c. The center image 190b may be slightly darker than the outer images 190a and 190c. Without the compensation provided by the processor 104, the stitched image 192 may include the band 194 with a different luminance and/or chrominance than the neighboring areas within the stitched image 192.

In accordance with another aspect of the stitching technique, the middle image 192b from the middle camera 102b may be compensated prior to the stitching. Calibration values (e.g., R_GAINC, G_GAINC and B_GAINC) may be used to alter the center image 190b in the compensation circuit 110b to generate a compensated image 196b. Additional calibration values (e.g., R_GAINR, G_GAINR and B_GAINR) may be used to alter the right image 190c in the compensation circuit 110c to generate a compensated image 196c. Still other calibration values (e.g., R_GAINRL, G_GAINL and B_GAINL) may be used to alter the left image 190a in the compensation circuit 110a to generate a compensated image 196a. The stitching circuit 112 may stitch the three compensated images 196a-196c to generate a stitched image 206. Since all of the images 196a-196c have been compensated relative to each other, the stitched image 206 generally lacks the dark band 194 present in the image 192.

The average values of the right camera 102c may be calculated by the statistics circuit 126 in the camera 102c per formulae 10 to 12 as follows:

$$RR=(RR1+RR5)/2 \tag{10}$$

$$GR=(GR1+GR5)/2 \tag{11}$$

$$BR=(BR1+BR5)/2 \tag{12}$$

The average values of the center camera 102b may be calculated by the statistics circuit 126 in the camera 102b per formulae 13 to 18 as follows:

$$RCR=(RC1+RC5)/2 \tag{13}$$

$$GCR=(GC1+GC5)/2 \tag{14}$$

$$BCR=(BC1+BC5)/2 \tag{15}$$

$$RCL=(RC2+RC6)/2 \tag{16}$$

$$GCL=(GC2+GC6)/2 \tag{17}$$

$$BCL=(BC2+BC6)/2 \tag{18}$$

The average values of the left camera 102a may be calculated by the statistics circuit 126 in the camera 102a per formulae 19 to 21 as follows:

$$RL=(RL2+RL6)/2 \tag{19}$$

$$GL=(GL2+GL6)/2 \tag{20}$$

$$BL=(BL2+BL6)/2 \tag{21}$$

The processor 104 may calculate two sets of calibration values for use during normal operations. An initial set may be used when the right side of the scene is as bright as or brighter than the left side of the scene (e.g., GR≥GL). For the initial set of calibration values, the processor may calculate the calibration values per formulae 22 to 30 as follows:

$$R\_GAINR=1.0 \tag{22}$$

$$G\_GAINR=1.0 \tag{23}$$

$$B\_GAINR=1.0 \tag{24}$$

$$R\_GAINC=RR/RCR \tag{25}$$

$$G\_GAINC=GR/GCR \tag{26}$$

$$B\_GAINC=BR/BCR \tag{27}$$

$$R\_GAINL=R\_GAINC*RCL/RL \tag{28}$$

$$G\_GAINL=G\_GAINC*GCL/GL \tag{29}$$

$$B\_GAINL=B\_GAINC*BCL/BL \tag{30}$$

The other set of calibration values may be calculated for a condition where the left side of the scene is brighter than the right side of the scene (e.g., GL>GR). For the other set, the processor may calculate the calibration values per formulae 31 to 39 as follows:

$$R\_GAINR=R\_GAINC*RCR/RR \tag{31}$$

$$G\_GAINR=G\_GAINC*GCR/GR \tag{32}$$

$$B\_GAINR=B\_GAINC*BCR/BR \tag{33}$$

$$R\_GAINC=RL/RCL \tag{34}$$

$$G\_GAINC=GL/GCL \tag{35}$$

$$B\_GAINC=BL/BCL \tag{36}$$

$$R\_GAINL=1.0 \tag{37}$$

$$G\_GAINL=1.0 \tag{38}$$

$$B\_GAINL=1.0 \tag{39}$$

The red, green, and blue compensation gains may be derived based on statistics of the captured raw images that contain the identical calibration chart (e.g., 180a) under a homogenous environment. The homogenous (or uniform) environment may provide identical reference data to compute the statistical differences among the cameras 102a-102n. To avoid a complexity of to convert the raw images from the Bayer domain to the YUV domain and the reality loss during the conversion, the compensation gains to balance the colors and the brightness may be calculated in the raw data domain. The gains may be applied at the sensor control (e.g., globally at the shutter, analog gain, digital gain of the sensor 120 and/or individually at the digital gain circuit 124 and/or at the image signal processing control (e.g., the compensation circuits 110a-110n). Therefore, the technique may correctly and quickly reduce the differences on the colors and the brightness among the cameras 102a-102n. As a result, the video of the stitched view (e.g., image 200) may be more smooth and fluent than without the compensation.

The functions performed by the diagrams of FIGS. 1-10 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
a plurality of cameras configured to generate a plurality of initial video signals of a scene, wherein (a) each of said plurality of cameras has a field of view and (b) at least two of said fields of view spatially overlap each other; and
a circuit configured to (i) generate calibration values for said cameras, (ii) modify at least one of said initial video signals by applying said calibration values and (iii) generate a final video signal to display by stitching together said initial video signals, wherein said calibration values are used by said circuit to generate approximately continuous visual parameters within said scene in said final video signal.

2. The apparatus according to claim 1, wherein (i) said visual parameters correspond to a brightness and (ii) said circuit generates approximately continuous brightness within said scene in said final video signal.

3. The apparatus according to claim 1, wherein said visual parameters correspond to colors and (ii) said circuit generates approximately continuous colors within said scene in said final video signal.

4. The apparatus according to claim 1, wherein said cameras are mounted on a vehicle.

5. The apparatus according to claim 1, wherein said plurality of cameras comprises at least three cameras.

6. The apparatus according to claim 1, wherein each of said plurality of initial video signals are modified by said circuit prior to being stitched together.

7. The apparatus according to claim 1, wherein said calibration values comprise at least one red gain value, at least one blue gain value and at least one green gain value.

8. The apparatus according to claim 1, wherein (i) said calibration values are generated during a calibration process.

9. The apparatus according to claim 8, wherein said calibration process is performed while (i) said plurality of cameras are positioned to capture video of a calibration chart, (ii) said calibration chart is uniformly illuminated and (iii) at least a portion of said calibration chart is visible in said fields of view of each of said plurality of cameras.

10. The apparatus according to claim 9, wherein (i) each of said initial video signals includes said calibration chart and (ii) said circuit is further configured to (a) measure a plurality of statistics of said calibration chart in said initial video signals, (b) generate said calibration values based on said statistics and (c) store said calibration values for use after said calibration process is completed.

11. A method for calibration for video stitching, comprising the steps of:
generating a plurality of initial video signals of a scene using a plurality of cameras, wherein (a) each of said plurality of cameras has a field of view and (b) at least two of said fields of view spatially overlap each other;
generating a plurality of calibration values for said cameras using a circuit;

applying said calibration values to modify at least one of said initial video signals; and generating a final video signal to display by stitching together said initial video signals, wherein said calibration values are used by said circuit to generate approximately continuous visual parameters within said scene in said final video signal.

12. The method according to claim 11, wherein (i) said visual parameters correspond to a brightness and (ii) said circuit generates approximately continuous brightness within said scene in said final video signal.

13. The method according to claim 11, wherein said visual parameters correspond to colors and (ii) said circuit generates approximately continuous colors within said scene in said final video signal.

14. The method according to claim 11, wherein said method further comprises a step of storing said calibration values in said circuit.

15. The method according to claim 11, wherein said cameras are mounted on a vehicle.

16. The method according to claim 11, wherein said plurality of cameras comprises at least three cameras.

17. The method according to claim 11, further comprising the steps of:

positioning said plurality of cameras to capture video of a calibration chart, wherein each of said initial video signals includes a portion of said calibration chart;

illuminating said calibration chart with a uniform light; and measuring a plurality of statistics of said calibration chart in said initial video signals using said circuit, wherein said calibration values are generated based on said statistics.

18. The method according to claim 17, wherein (i) said calibration chart comprises a two-dimensional array of patches and (ii) each of said patches comprises a plurality of regions having different levels of brightness.

19. The method according to claim 18, wherein said fields of view that spatially overlap each other on said calibration chart overlap by at least one column of said patches.

20. The method according to claim 17, wherein said statistics are determined from raw images captured by said cameras.

* * * * *